United States Patent [19]
Andre et al.

[11] Patent Number: 5,953,997
[45] Date of Patent: Sep. 21, 1999

[54] COMPOSITE ARTICULATED CONNECTION FOR A PUBLIC TRANSPORTATION VEHICLE

[75] Inventors: Jean-Luc Andre, Obernai; Martin Koerber, Mutzig, both of France

[73] Assignee: Lohr Industrie, Hangenbieten, France

[21] Appl. No.: 08/903,245

[22] Filed: Jul. 24, 1997

[30] Foreign Application Priority Data

Jul. 26, 1996 [FR] France .................................. 96 09613

[51] Int. Cl.⁶ ....................................................... B61F 5/00
[52] U.S. Cl. ................................ 105/4.1; 105/3; 105/8.1
[58] Field of Search .................................. 105/1.4, 3, 4.1, 105/8.1, 13, 14; 280/400, 403, 408, 419, 477, 504

[56] References Cited

U.S. PATENT DOCUMENTS

| | | | |
|---|---|---|---|
| 4,458,911 | 7/1984 | Chadwick et al. | 280/403 |
| 5,197,392 | 3/1993 | Jeunehomme | 105/3 |
| 5,784,967 | 7/1998 | Lohr | 105/3 |

FOREIGN PATENT DOCUMENTS

| | | | |
|---|---|---|---|
| 0177424 | 4/1986 | European Pat. Off. . | |
| 0291681 | 11/1988 | European Pat. Off. . | |
| 0479458 | 4/1992 | European Pat. Off. . | |
| 519813 | 12/1992 | European Pat. Off. | 105/3 |
| 2374195 | 7/1978 | France . | |
| 2549436 | 1/1985 | France . | |
| 2705620 | 7/1995 | France . | |
| 254387 | 3/1964 | Netherlands | 105/3 |
| 109603 | 10/1966 | Norway | 105/3 |
| 9534435 | 12/1995 | WIPO . | |

Primary Examiner—Mark T. Le
Attorney, Agent, or Firm—Davis and Bujold

[57] ABSTRACT

A composite articulated connection between a successive first car (8) and a rear car (9) are supported by an intermediate module (10) and comprise a purely pivoting articulated front connection (LAV) pivoting about a first vertical pivot axis between the front car (8) and the intermediate module (10) and a complex rear connection (LAR) formed of a connection pivoting about a second vertical pivot axis, a lower clearance stabilization center (CIAD) and an upper clearance stabilization center (LASD). The first axis (B–B') and the second vertical pivot axis (C–C') are located closely adjacent one another or are combined with the median vertical pivot axis (A–A') of the intermediate module (10). The composite articulated connection is of interest to manufacturers of public urban transportation vehicles.

21 Claims, 13 Drawing Sheets

COMPOSITE ARTICULATED CONNECTION FOR A PUBLIC TRANSPORTATION VEHICLE

The present invention relates to a composite articulated connection between two successive vehicles of a self-guiding public transportation vehicle with intermediate axles, each supported by an intermediate module allowing passengers to pass between successive vehicles. French Patent No. FR-A-2705620 (LOHR INDUSTRIE) describes public transportation vehicles of this type.

The public transportation vehicles consist of several cars, forming a train of vehicles. The cars are each supported and interconnected by an intermediate module and supported by an axle which is not guided along the ground.

This train-like design reduces the space required for turns because the articulated connection maintains the relative positions of the cars and modules, even on sharp curves and irregular roadways.

The design can be improved by adding to each module a device for guiding it along the ground, or more specifically, for guiding it along a rail on the ground.

Such guide devices already exist. Their use reduces the space required for the vehicle to negotiate curves. They consist mainly of devices with lifting arms, which have a pair of inclined guide wheels at one end to engage the guide rail.

There must be enough space in the lower region on either side of the axle to accommodate such devices, as well as enough depth to raise and lower them.

The aforementioned solution described in the patent of LOHR INDUSTRIE prevents the use of one or more of such guide devices on road vehicles of this type because the lower articulations occupy the space needed to tilt and raise the guide wheels.

This presents an even greater problem if the vehicles have a floor that must be close to the ground.

Even if it were possible to find a way to house the guide devices while maintaining the lower articulations in place or displacing them only slightly, traveling on curves would exert considerable stress on the guide wheels, wearing them out quickly and making them less dependable.

The few advantages of a vehicle that has a lower ground clearance are not significant today, since municipalities are now demanding cars with steps that can be lowered to a loading platform when children or handicapped persons in wheelchairs board.

Various prior art solutions to this public transportation requirement all concerned railway vehicles, which are not subject to the same restrictions regarding size and motion.

The first general goal of the present invention is to reduce lateral acceleration and interference at the connections between cars, which affect passenger comfort, and consequently to reduce wear on the guide wheels. A second goal is to equip the intermediate modules with automatic lower guide means, while at the same time providing space on the lower portion of the cars and the intermediate modules for the floor to be lowered as far down as the quay platform.

The final goal is to allow intercirculation between intermediate modules, despite all the limitations enumerated above, within the scope of an automatically guided roadway train.

Furthermore, the invention provides an interesting alternative to a heavy investment such as a tramway for public transportation systems.

The inventive concept consists of placing as close together as possible to the pivot axle which is perpendicular to the axle in the middle, the vertical pivot axles of the front and rear articulated pivoting connections joining two adjacent vehicles to the corresponding intermediate module.

As previously indicated, this inventive solution is the result of research into improving passenger comfort, since lateral acceleration bounces the passengers around at the beginning of curves or on uneven terrain, which should be reduced as much as possible.

Also, reducing lateral acceleration coincidentally decreases wear on the guide wheels, since less stress is exerted on them.

Furthermore, the inventive solution offers increased space in the lower portion of the car and the intermediate module, since the lower structures are lightened and the upper structures bear the main stress.

Moreover, the invention provides for a passageway large enough for passengers to circulate through the intermediate module.

Other characteristics and advantages of the invention will be apparent from the following description, provided as a non-limiting example of one embodiment, with reference to the drawings, wherein.

Figure 1:
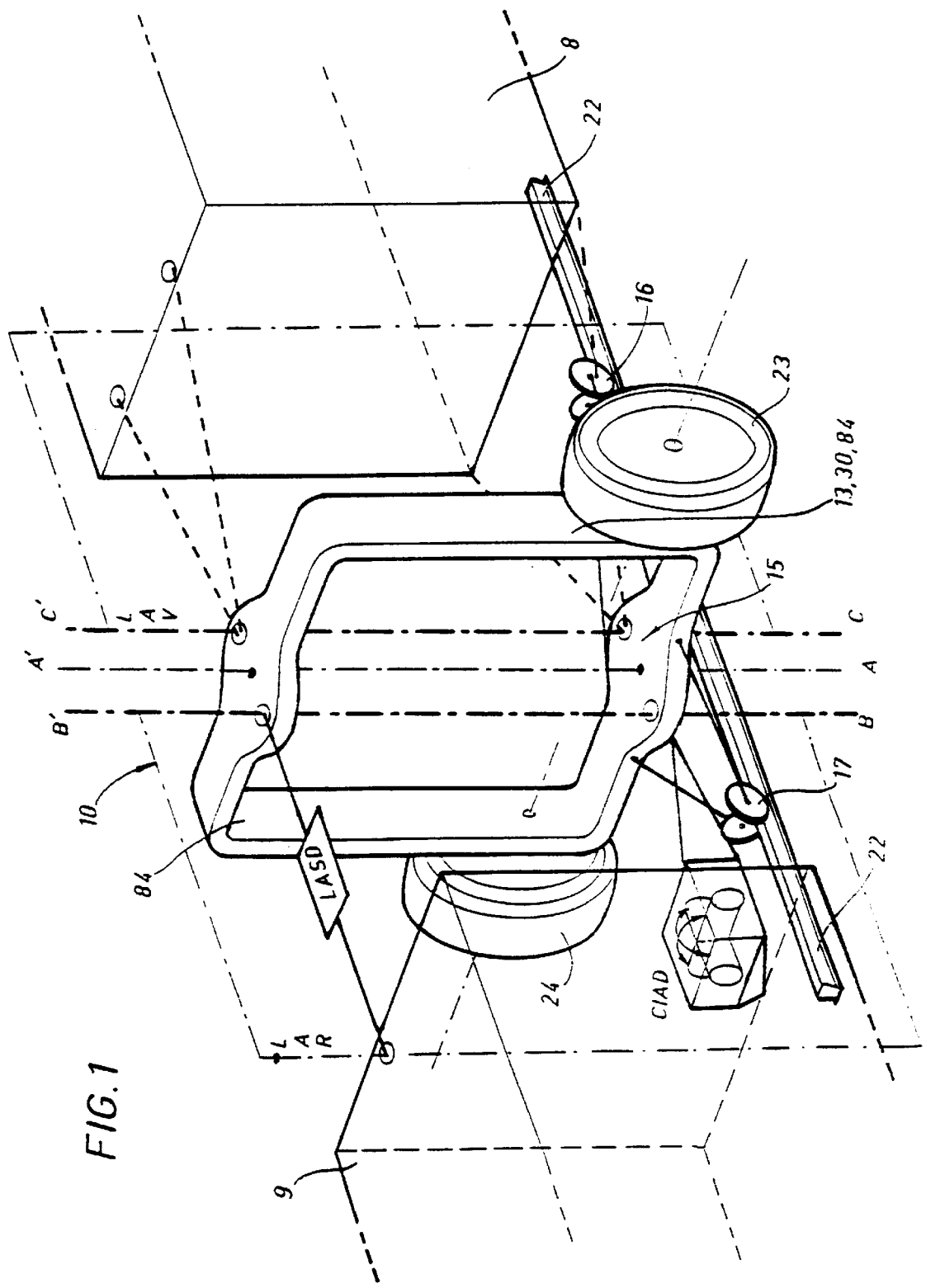
FIG. 1 is a schematic view of the unit showing the functional blocks and the vertical pivot axles between two successive cars and one intermediate module.

With reference to FIG. 1, a vertical pivot axis A–A' is defined as the axle which is perpendicular in its middle to the line of the axle of the intermediate module.

A vertical or quasi-vertical front pivot axis B–B' is defined, as well as a rear vertical pivot axis C–C' between adjacent cars and the intermediate module.

The reason front axis B–B' is inclined slightly is to improve stability on turns.

Also defined is a front articulated connection LAV and a rear articulated connection LAR, the latter incorporating the function of purely pivoting on a vertical axis, as well as the other articulation functions necessary for the general functioning of the composite connection according to the invention. There is also defined a lower articulated connection CIAD and an upper rear stabilizing connection LASD which comprises LAR in all cases.

First, the general means used by the invention will be described, with reference to the general schematic drawing.

The invention is based on the general inventive concept of placing axes A–A', B–B' and C–C' close together or even combining them, in order to substantially reduce or even totally eliminate lateral acceleration, and bypassing technical solutions for other functions that would either have an adverse affect on the invention's other advantages, or prove too costly or too difficult to use.

The general inventive concept further consists of placing, in every case, the lower articulated connection CIAD in a lower position within the rear articulated connection LAR.

The ideal theoretical solution would be defined as combining axes B–B' and C–C' with axis A–A', forming CIAD as an articulated pendular unit, for example, a universal joint, placed in a lower position, and providing an upper rear connection for stabilizing wheel clearance movement LASD.

The goal of the invention is to make this ideal, theoretical solution usable in the technical and industrial realm, and to propose several variations, each with its own advantages.

On a practical level, a connection is established at the front between the car and the intermediate module using a purely pivoting articulated connector LAV pivoting on a vertical pivot axis B–B' parallel to axis A–A', and either located as close as possible to the latter, or combined with it. At the rear, a complex rear articulated connection LAR is established comprising a purely pivoting articulated connector pivoting on vertical axis C–C' parallel to axis A–A' and either located as close as possible to the latter, or combined with it, said pivoting connection being completed by a pendular lower connection CIAD, made in various ways, and doubled by the upper rear clearance stabilizing connector LASD, also made in various ways.

These different possibilities give rise to various embodiments, each with its own advantages, of which three principal embodiments will be described herein. Other variations derive more or less directly from these basic variations.

The general function of the composite articulated connector according to the invention is to allow pivoting motion between two successive cars suspended through an intermediate moving module, while absorbing all lateral and vertical motions, or combinations of the two. The primary goal is to substantially reduce or totally eliminate lateral acceleration due to forward or backward movement between the central pivot axis perpendicular to the axle, and the pivot axes associated with the articulated connectors of the intermediate module with each adjacent car.

First, for reasons of simplification and before beginning the detailed description of each of the variations, the characteristics common to all variations will be described.

Figure 5:
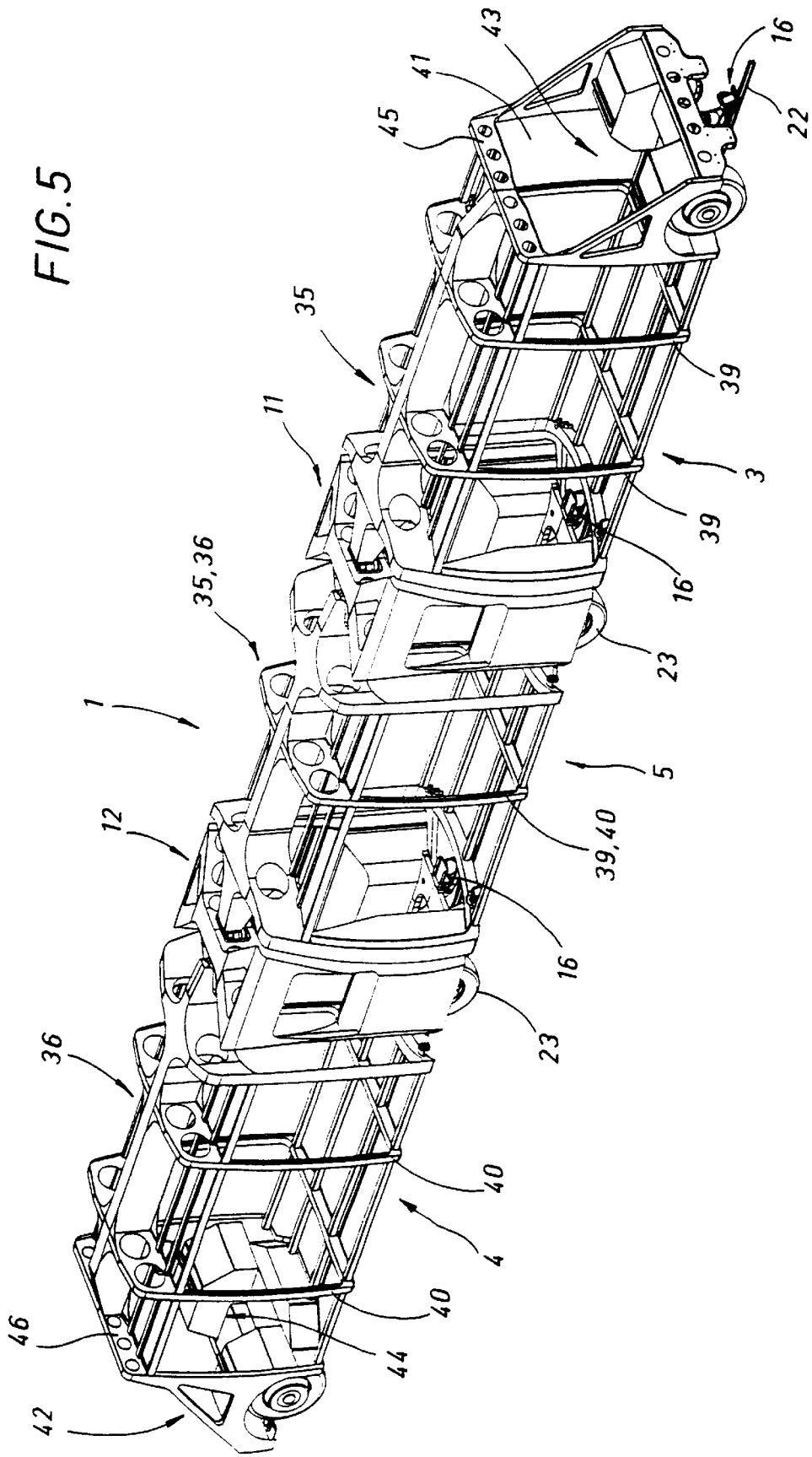
FIG. 5 is a perspective view of the skeleton of a train with three cars and two intermediate modules according to the oblique rod variation.
Figure 6:
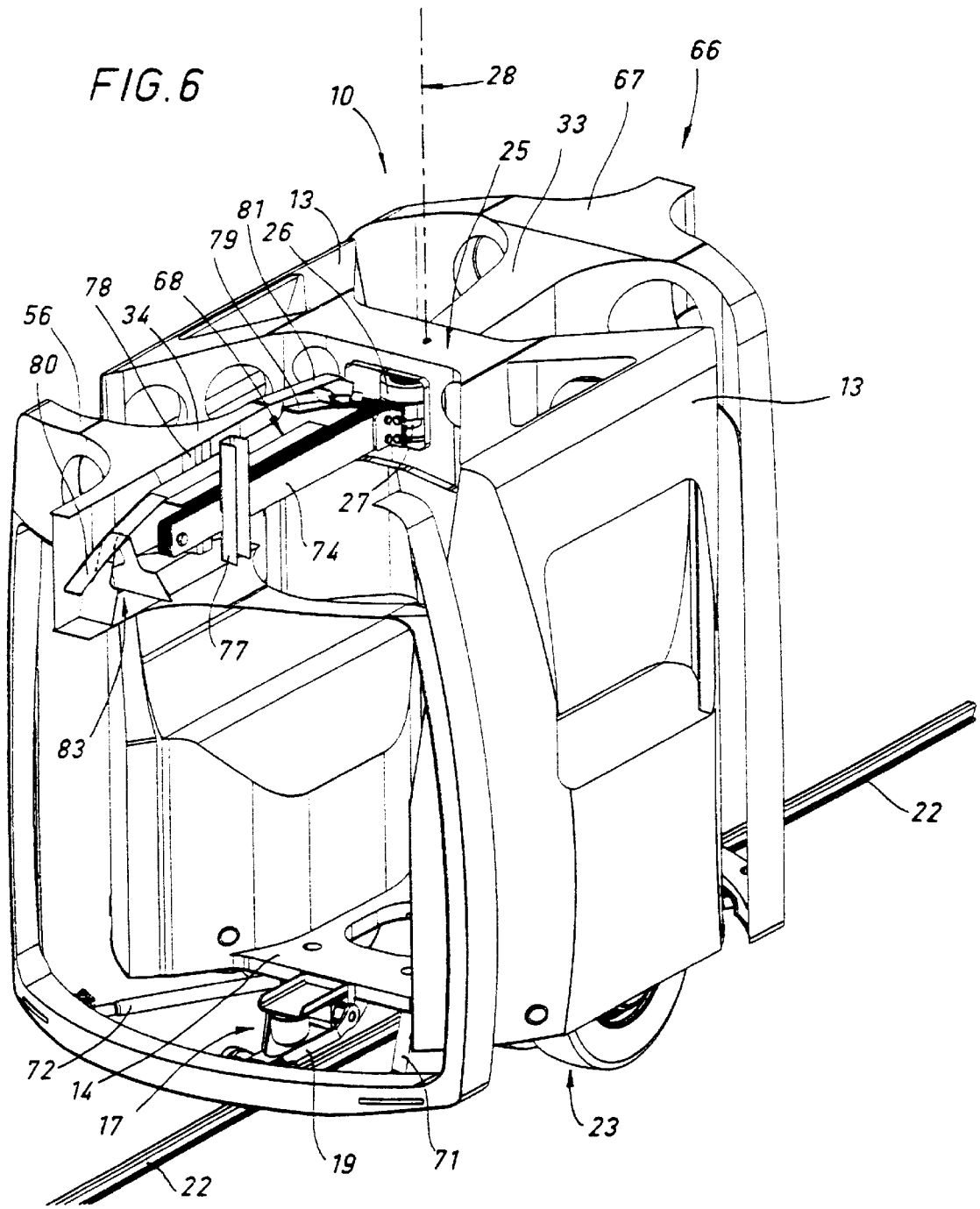
FIG. 6 is a perspective of the rear of an intermediate module according to the oblique rod variation.
Figure 7:
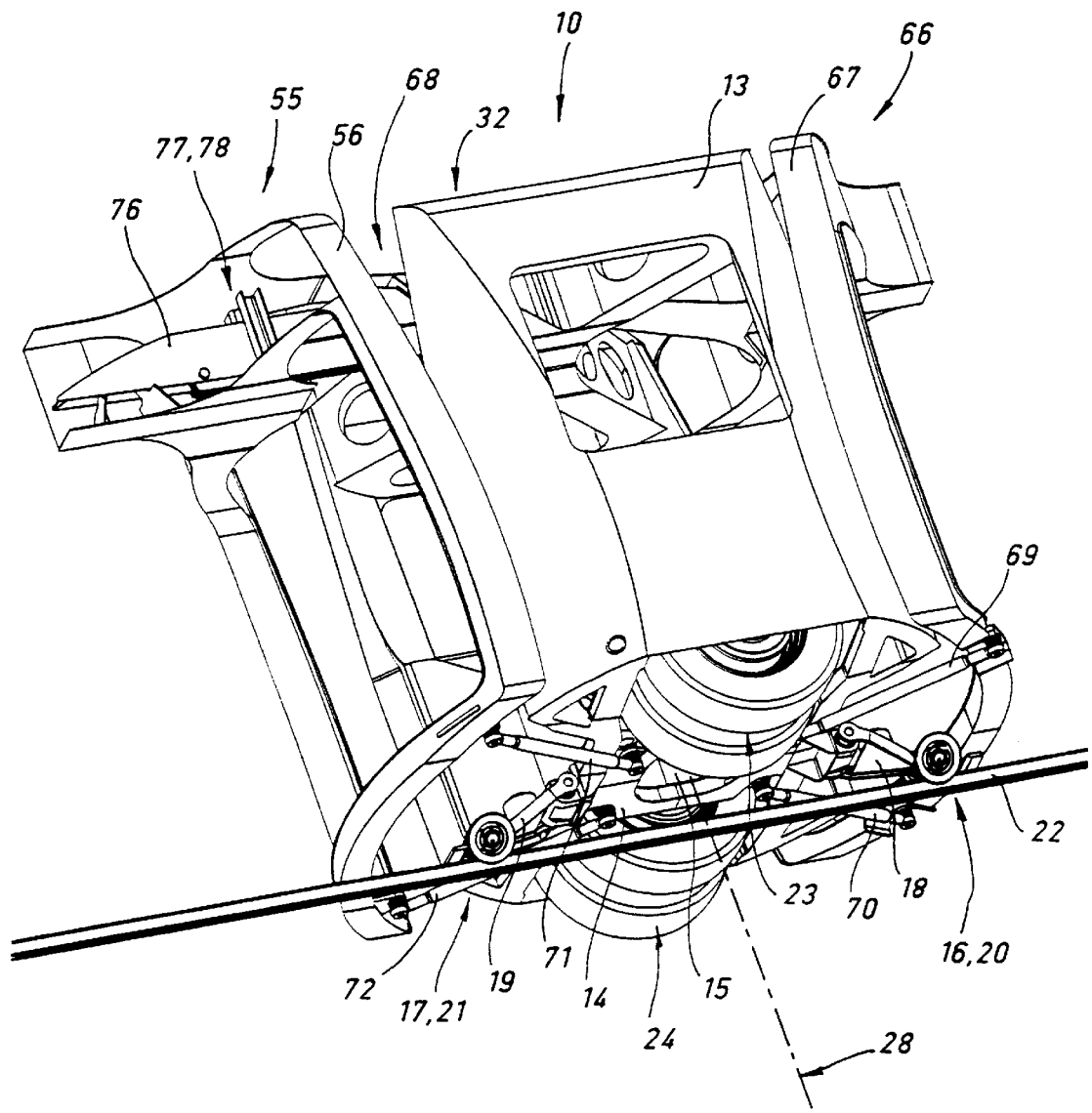
FIG. 7 is a perspective showing the bottom of an intermediate module according to the oblique rod variation.
Figure 13:
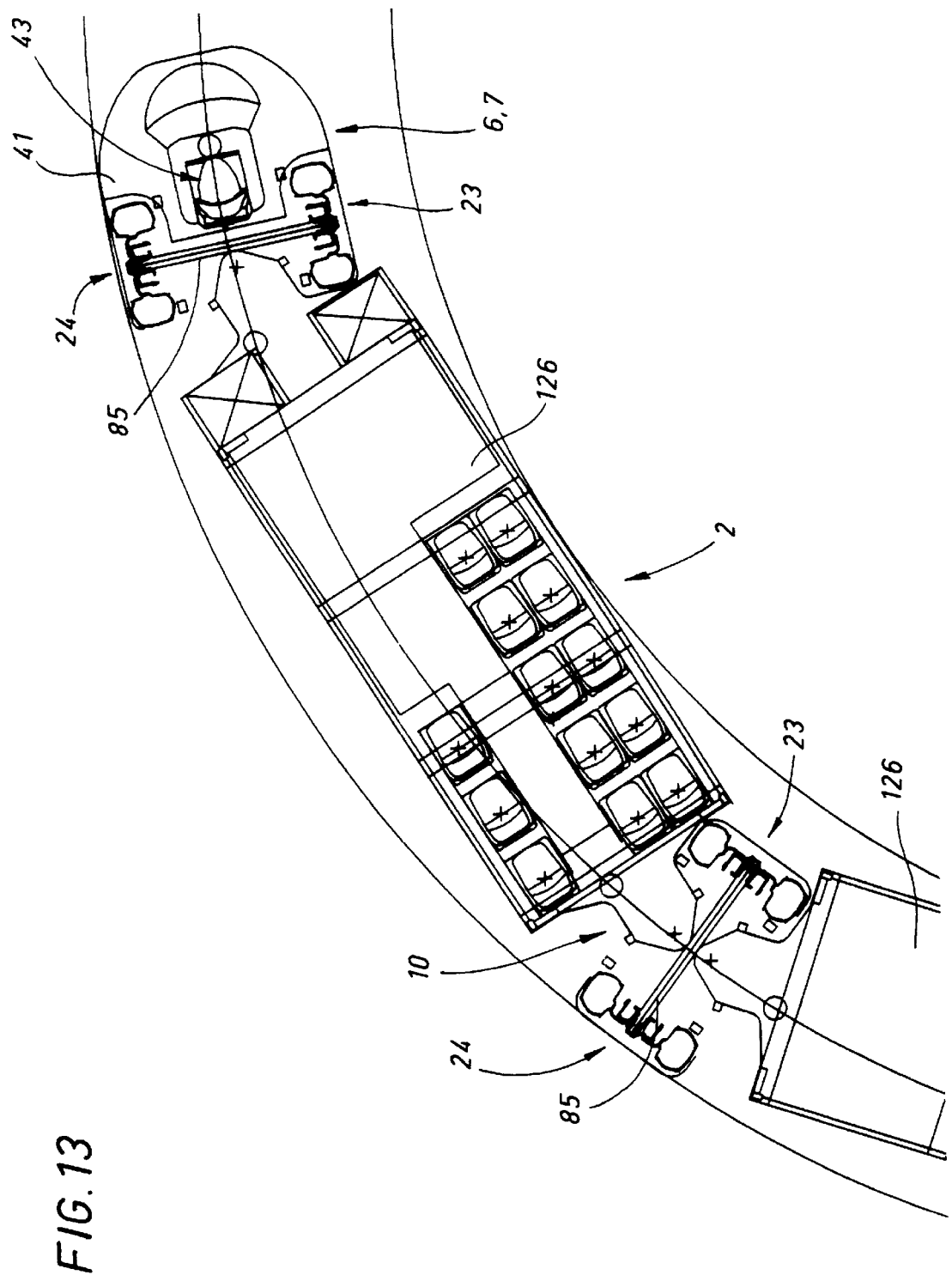
FIG. 13 is a plan view of the final variation showing one of the motorized directing heads connected to an adjacent car with the same type of connector.

Public transportation vehicle 1 or 2 which is the subject of the invention consists, in the minimal basic version, of at least two single cars or end cars, i.e. a front car 3 and an end car 4, and in a common version, a supplemental central car 5 (FIGS. 2 and 5) or two motorized end cabins 6, 7 (FIG. 13). Naturally, the configurations with or without motorized heads are applicable to all variations. Two successive cars, a front car 8 and a rear car 9, are separated by a movable articulating support called an intermediate module 10. The latter forms a moving intermediate contact, with or without a motor, for supporting the cars, as well as a composite articulated connector between two successive cars.

There could also be a longer vehicle formed of two end cars and one or more intermediate cars.

The versions that are shown will be taken as examples of embodiments. The vehicle may consist of two end cars 3 and 4 and one central car 5, separated by two intermediate modules 11 and 12 (FIGS. 2 and 5), or the vehicle may have motorized end cabins 6 and 7 as shown in FIG. 13.

Two successive cars 8, 9 are supported and articulated to each other by an intermediate module 10 consisting of a moving articulated support formed of a carriage support 13 with a frame-like structure attached to a chassis 14 supported by an axle or a directional unit 15, for example, a motor.

Chassis 14 and thus the axle or directional unit 15 are oriented by at least one or two guide means 16, 17 if two directions of operation are desired, as with the variations shown in the drawings. The guide means may be formed of two opposing guide arms 18, 19. Each guide arm is probably raisable and has a pair of inclined guide wheels 20, 21 at one extremity which engage and roll along a guide rail 22 on the ground thus orienting the direction of wheels 23, 24 or of the pairs of wheels in the direction or directions of travel.

The structure of chassis 14 is low relative to the ground in order to gain space at the base and to situate the floor at a desirable low level so it extends from the plane of the loading platform.

This space gain is achieved because the upper structures assume the stress, thus making it possible to lighten the lower structures.

The invention has three preferred embodiments which incorporate its principal functions using different mechanical equivalents.

Figure 2:
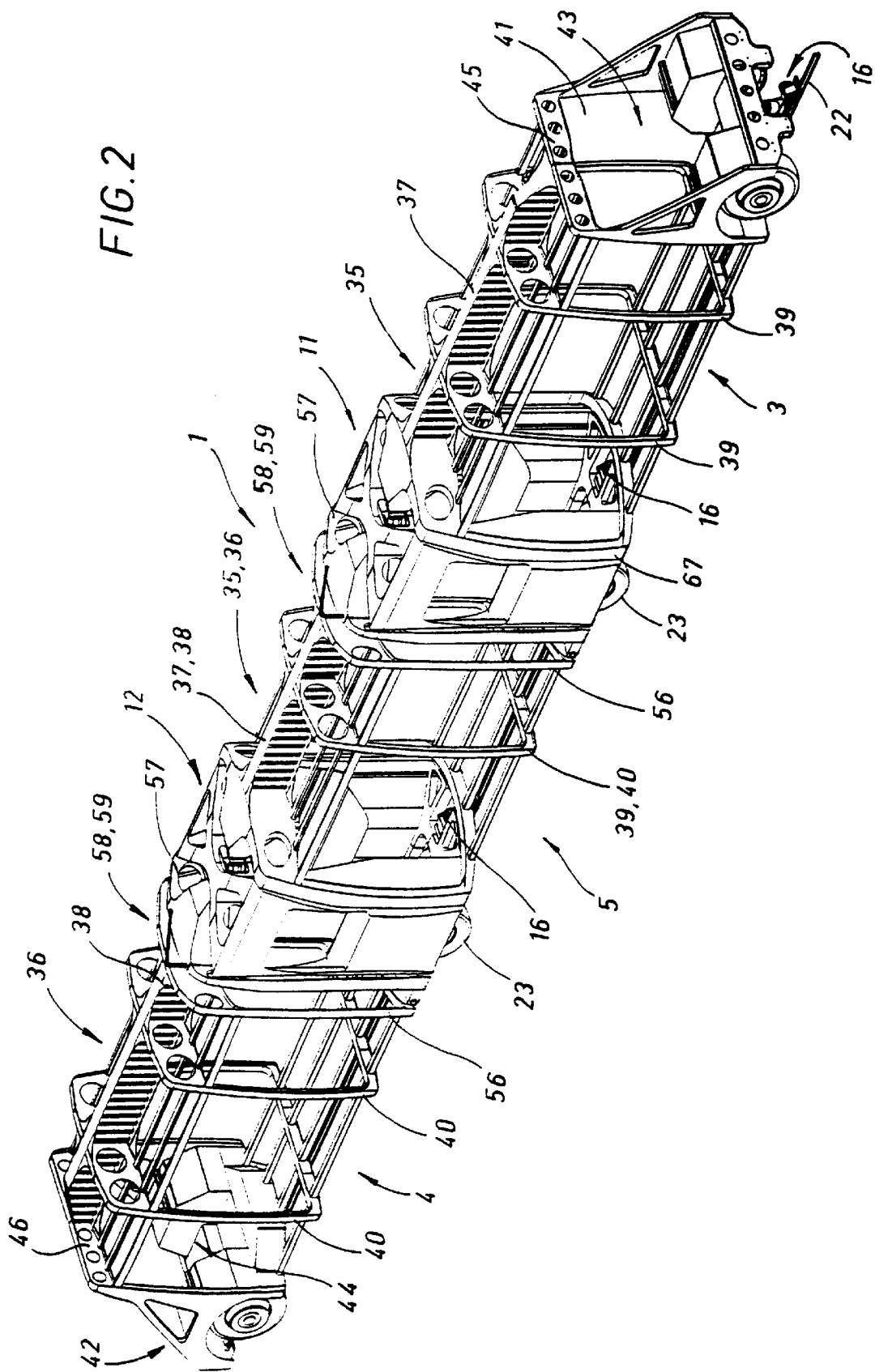
FIG. 2 is a perspective of the unit showing the skeleton of a train with three cars and two intermediate modules according to the sprocket variation.
Figure 3:
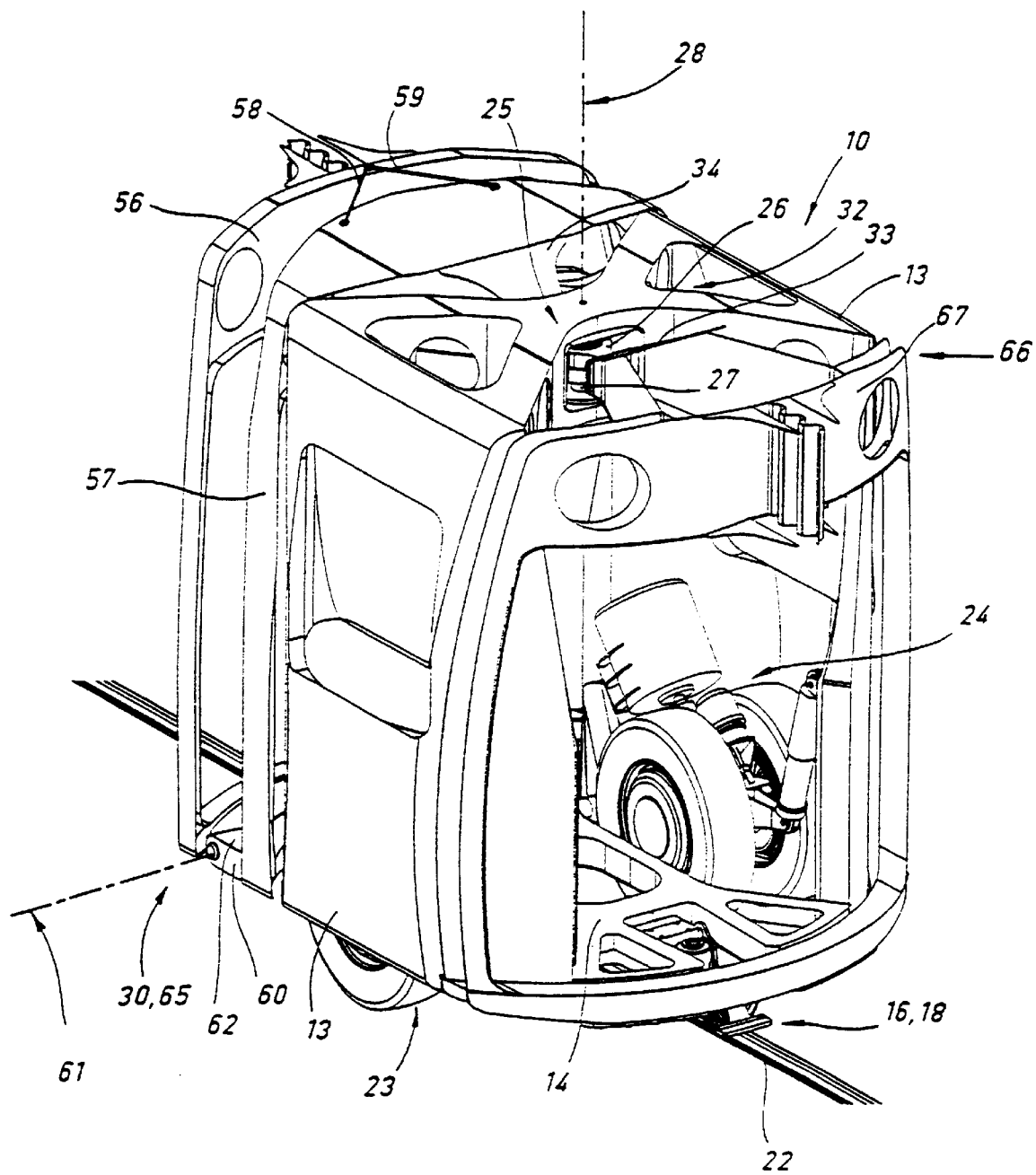
FIG. 3 is a perspective of the front of an intermediate module according to the sprocket variation.
Figure 4:
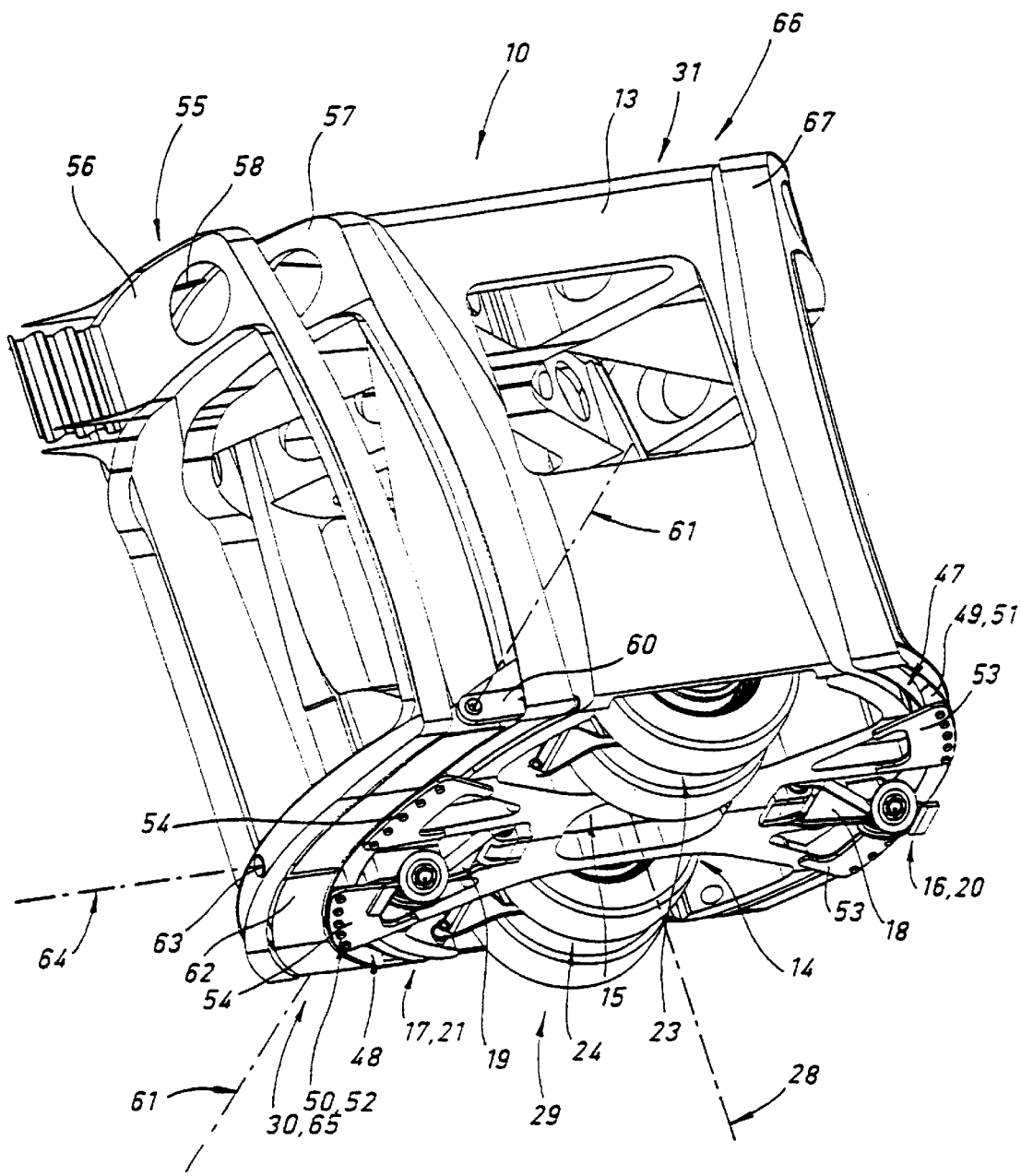
FIG. 4 is a perspective showing the underneath of an intermediate module according to the sprocket variation.

There is a first variation using a sprocket as shown in FIGS. 2 through 4, a variation using oblique rods shown in FIGS. 5 through 8, and a variation using ball joint connections shown in FIGS. 9 through 13.

Needless to say, other variations are possible by using equivalent means and/or simply incorporating one or more elements from the basic variation or combining elements.

For example, it is possible to use the front of the second version and the rear of the third version.

The first variation will now be described with reference to FIGS. 2 through 4.

According to this variation, the composite articulated connector through an intermediate module according to the invention, comprises an upper pivoting articulating block 25 through which the extremities of the successive cars are joined. This block is formed of two superimposed pivoting articulations 26 and 26 with a common vertical pivot axis 28 combined with axis A–A'.

This upper articulating block 25 is completed at the lower portion by a sprocket articulation 29 pivoting around the common vertical pivot axis 28, and the intermediate module 10 is connected at the lower portion to the next car by a complex universal joint articulation 30, which will be described below, forming the lower connection CIAD.

The chassis structures 14 of intermediate module 10 are attached to an ascending unit 31 having two vertical lateral walls interconnected at their top portions by a multi-branching mechanical structure 32 which both supports and maintains in the central upward position, upper pivoting articulation block 25, with the entire unit being suspended on axle 15 of intermediate module 10.

On the upper articulated pivot block 25 there are the joined extremities of the extensions 33 and 34 of the structures or of upper chassis, 35 and 36, respectively, of front and rear cars 8 and 9, which extremities pivot on two superimposed articulations 26 and 27. These extensions 33 and 34 each constitute a connecting directional means connecting the supporting upper chassis 35 or 36 and the corresponding pivoting articulation 26 or 27 of the framework of each car. These upper chassis supports 35, 36 are thus supported by the intermediate module 10 as it appears in the drawings, since the upper pivoting articulating block 25 constitutes the only vertical support zone for the extremities of the upper car chassis. Thus, by positioning the supporting structures at the top, the dimensions of the lower structures are decreased, lightening these structures and making it possible for the platform to be not only lower and slimmer, but also closer to the ground, more spacious, and level with the loading platform. Thus, one of the objectives of the invention is accomplished.

Each car has an upper beam 37, 38 on the frame supporting the framework and from which the framework develops. The framework consists of a plurality of transverse elements called couples such as square elements 39, 40, the upper portion of which is integral with the upper beam of frame 37, 38. These transverse couples define the transverse section of the interior utility space in each car. They form an open cage on its longitudinal surfaces and a closed cage on the upper and lower longitudinal surfaces, as shown in FIGS. 2 through 5.

Because upper frame beams 37, 38 bear the vertical stress, the structure supporting the floor can be of reduced thickness. By taking advantage of the lower structure made possible with this type of vehicle, the floor can be made level with the loading platform.

The front and/or rear portions of the end cars have an inclined, glass surface 41, 42 with a space 43, 44 for driving the vehicle. The other extremity of each cabin is a square shaped extremity 45, 46 marking the end of the upper longitudinal skeletal beam 37, 38.

With specific reference to FIGS. 3 and 4, chassis 14 of intermediate module 10 of the first variation is perpendicular in relation to the ends of the cars, with two opposing curved tracks 47, 48 for displacement of the roller elements 49,50, for example, vertical rollers such as 51, 52. The rollers are in two groups, which are each supported on each side by two horizontal plates such as plate 53, 54 integral with the chassis.

According to one detail of the variation shown, the curved tracks are made in the shape of two arched pieces of metal separated by a distance that approximates the diameter of the rollers so that they can be displaced without appreciable play.

Thus, two purely pivoting articulations or half-articulations are effected around common pivot axis 28 combined with axis A–A' for each of connections LAV and LAR.

The front extremity 55 of the rear car opposite the rear surface of the intermediate module has a composite structure with two juxtaposed end frames 56,57, the first frame 56 being integral with the extremity of the rear car 9, and the second frame 57 being integral with intermediate module 10, both frames being movable and joined at their lower portions by a universal joint.

Frames 56 and 57 are joined at their upper portions by a clearance stabilizing connector formed of one or more shock absorbers, for example two shock absorbers 58 and 59, in a V-shaped arrangement, as shown.

Frame 57, integral with intermediate module 10, has at each extremity of its lower portion, a longitudinal lateral leg such as element 60 for supporting a transverse pivot axis 61 and connecting it through an intermediate element 62 to the first extremity frame 56 integral with rear car 9, constituting a pivoting articulation on transverse lateral axis 61.

This lateral articulation is completed by another vertical articulation 63 pivoting around a longitudinal median axis 64 between the intermediate piece 63 and the lower median portion of the first end frame 56. These two articulations on the same intermediate element together form a universal joint articulation 65 which absorbs the lateral and vertical motions of rear car 9 in relation to intermediate module 10.

The relative pivoting movements corresponding to the directional modifications in front and rear vehicle orientation and their extremities 55, 56 in frames 56, 57 and 67 are both ensured by upper pivot block 25 described in conjunction with the lower roller means.

According to a second basic variation shown in FIGS. 5 through 8, the rollers and the articulation to the universal joint are replaced on the front side by two oblique rods, and the rollers are also replaced on the rear side by two oblique rods completed by a specific upper connection 68 between the upper articulated pivot block 25 and the corresponding upper beam 38 on the framework.

According to this variation, on each side of axle 15, between the central portion of chassis 14 of intermediate module 10 and positioned symmetrically in relation to the common pivot axle and each of the lifting guide arms (version with two guide arms), there are a front pair and a rear pair of oblique rods 69, 70; 71, 72, of constant length, connected with a ball joint at each extremity first to chassis 14 of the intermediate module, and then to the lower portion of each of the end frames of successive cars 8, 9.

These oblique rods represent the mechanical equivalents of the purely pivoting sprocket articulations of the preceding version on the current pivot amplitudes on curves. For this reason, the term "quasi-pivoting" will be adopted to designate these articulations.

Figure 8:
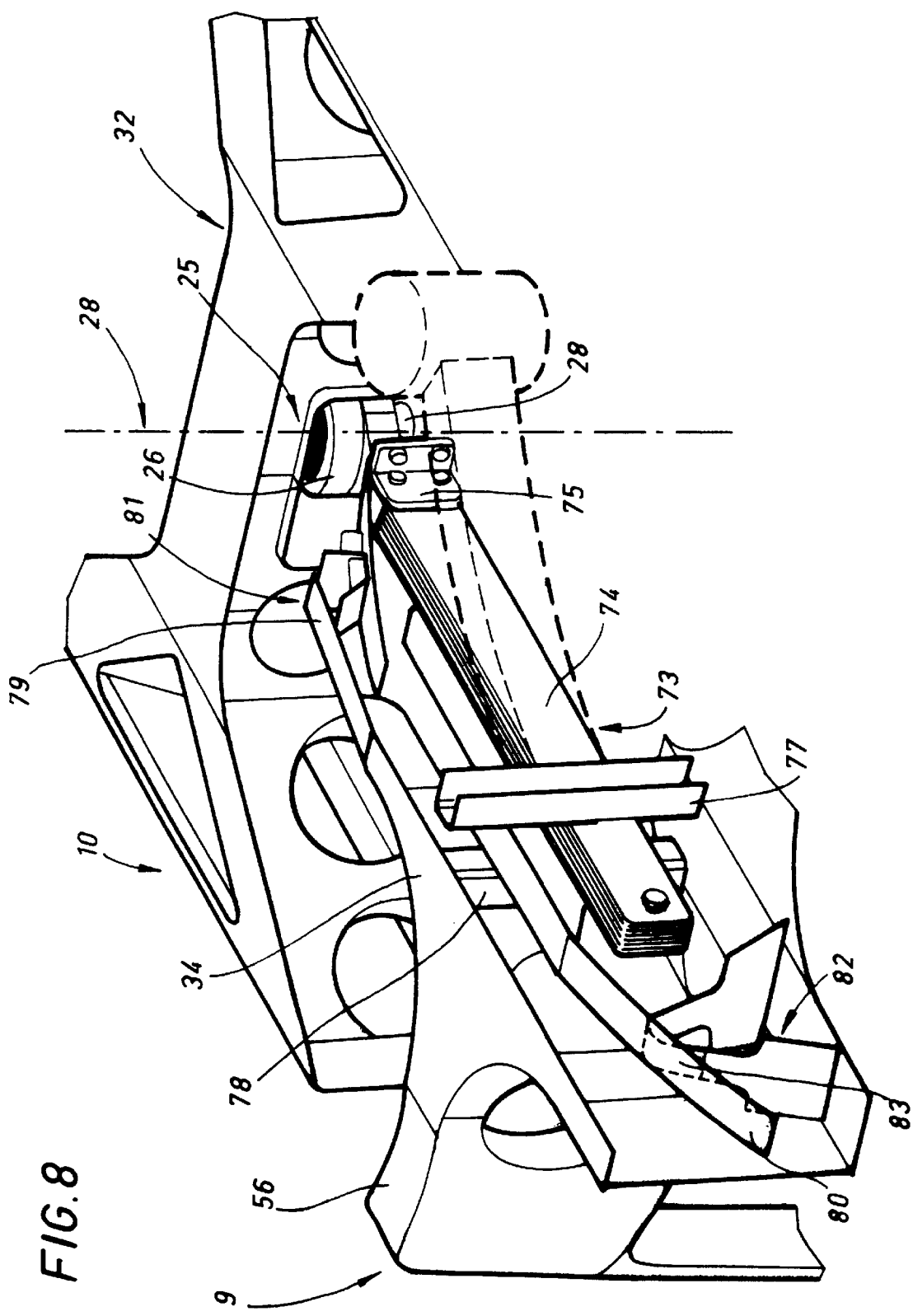
FIG. 8 is a detailed perspective showing the upper stabilizing wheel clearance connectors used on the oblique rod variation between the rear car and the intermediate module.
Figure 9:
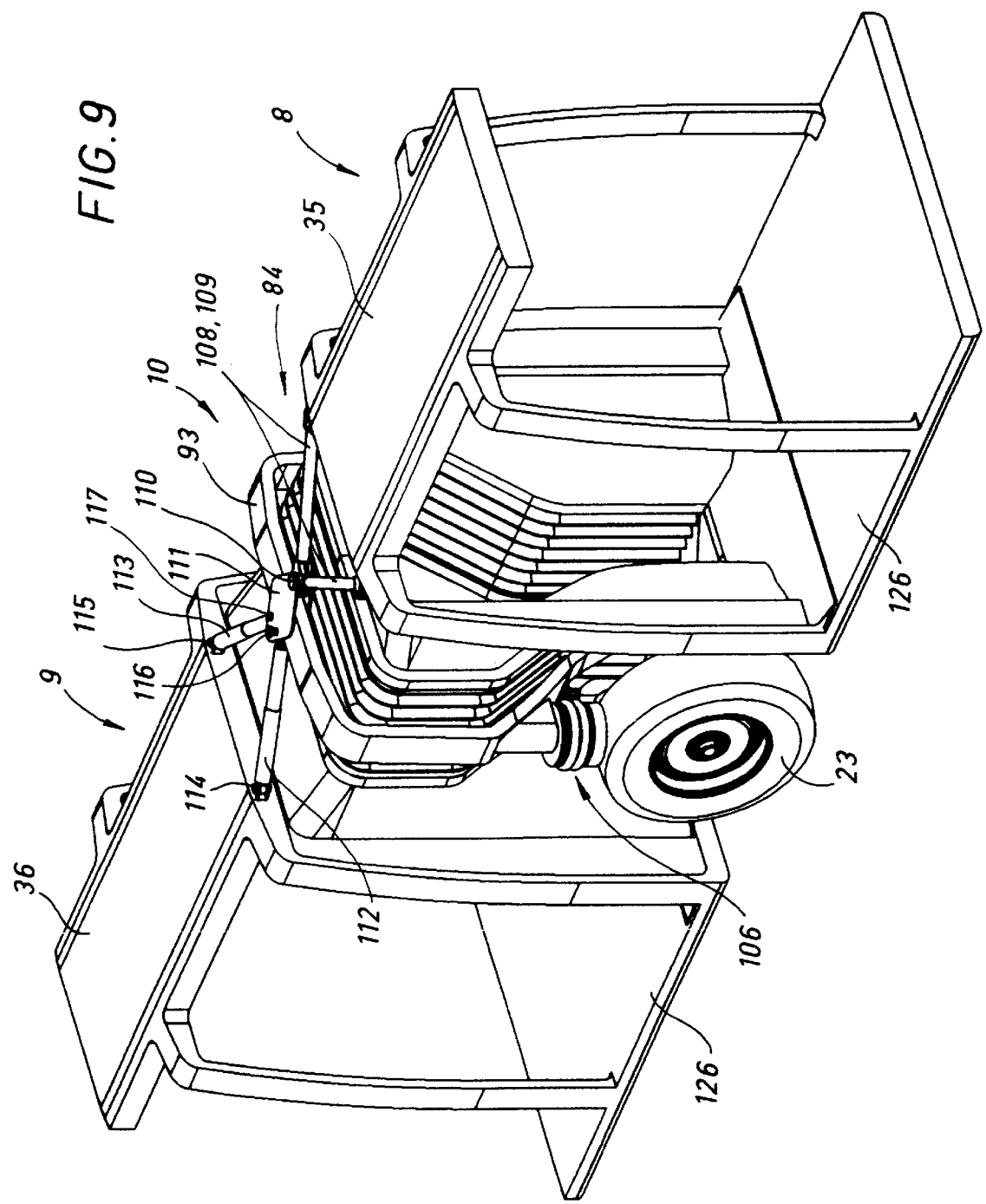
FIG. 9 is a general perspective view of a supplemental variation with ball joint connections.
Figure 10:
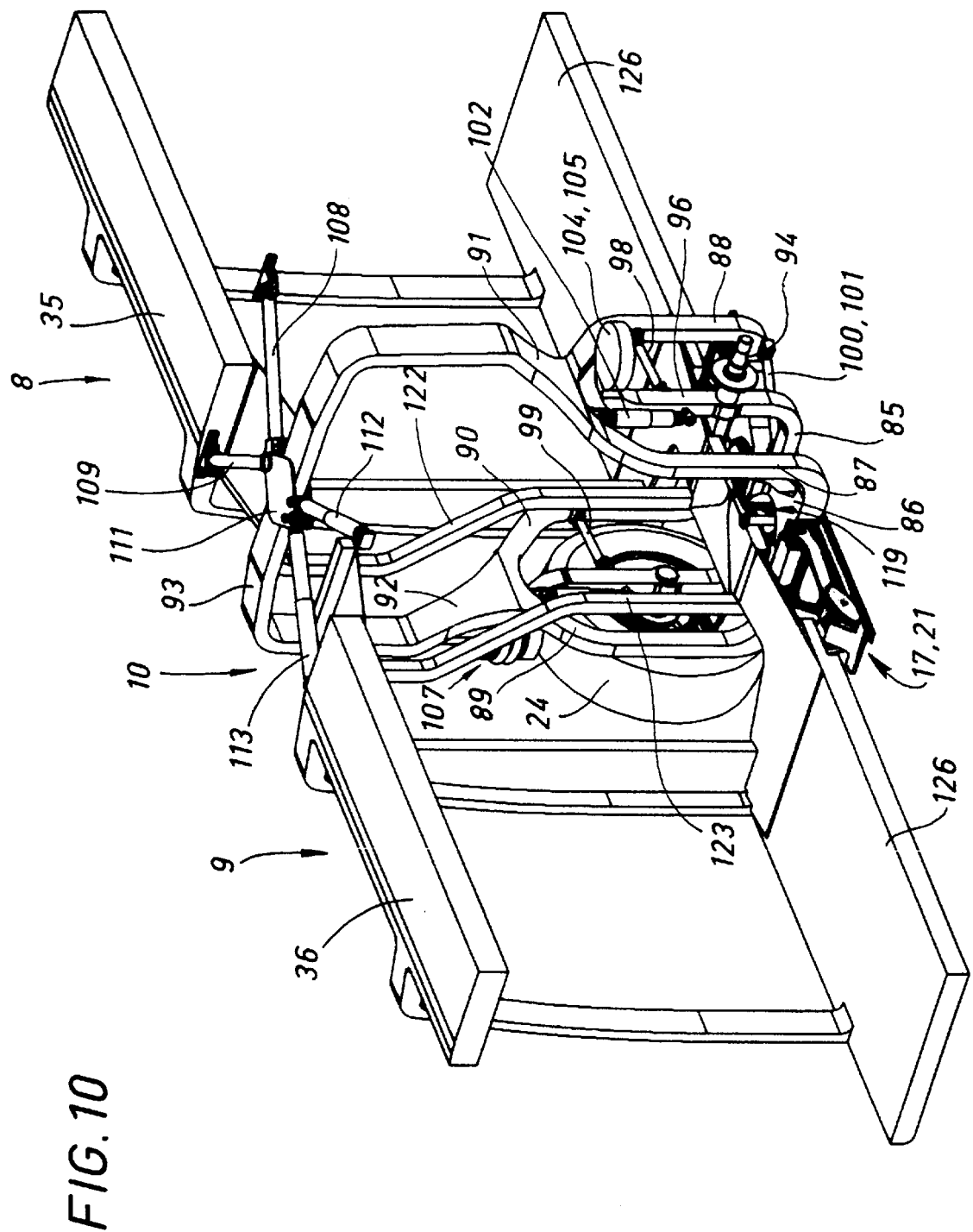
FIG. 10 is a general perspective view of the composite connection in a supplemental variation taken from one angle with an intermediate module without any protective connector and without one of its wheels.
Figure 11:
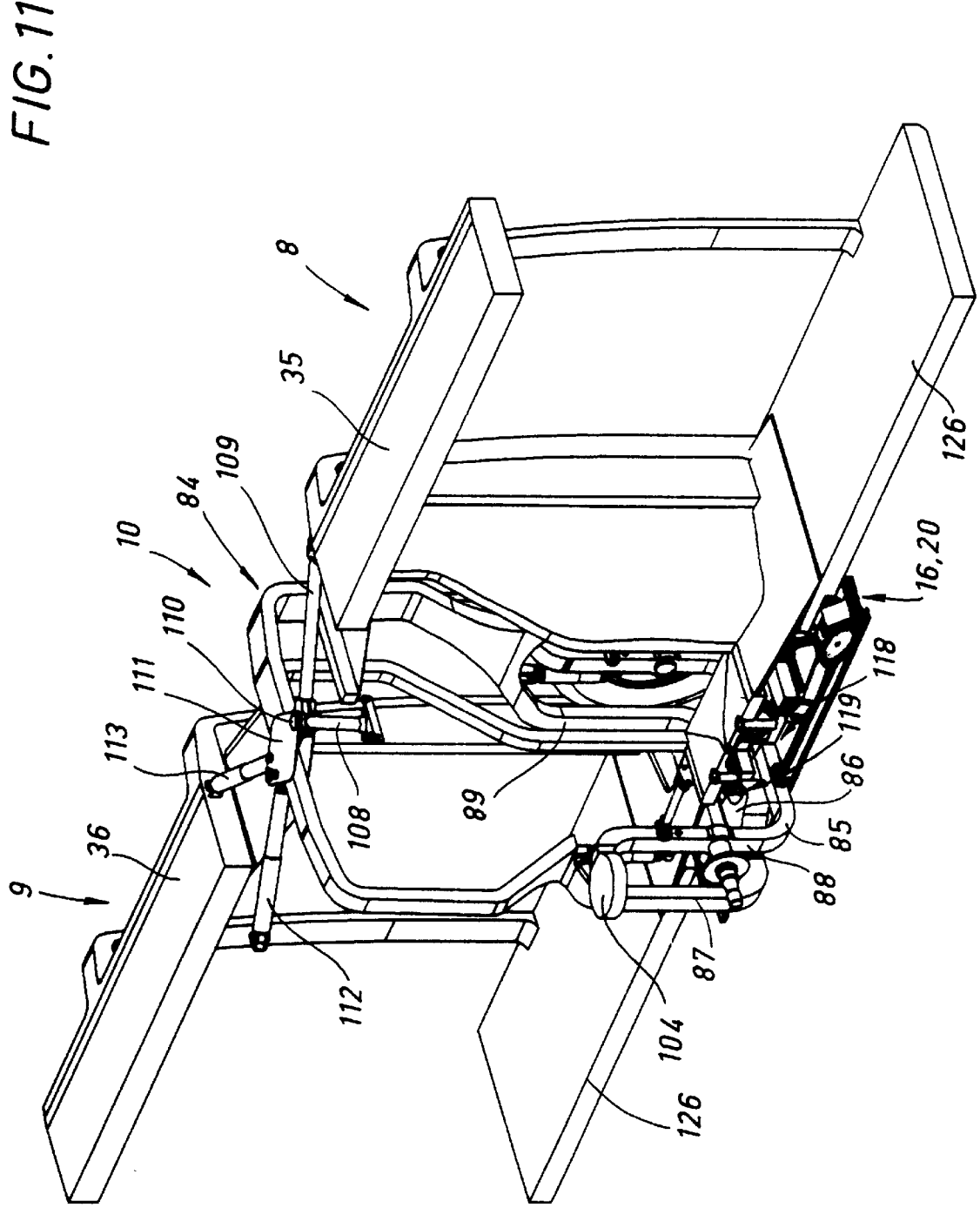
FIG. 11 is a view analogous to that of FIG. 10, taken from a second angle.
Figure 12:
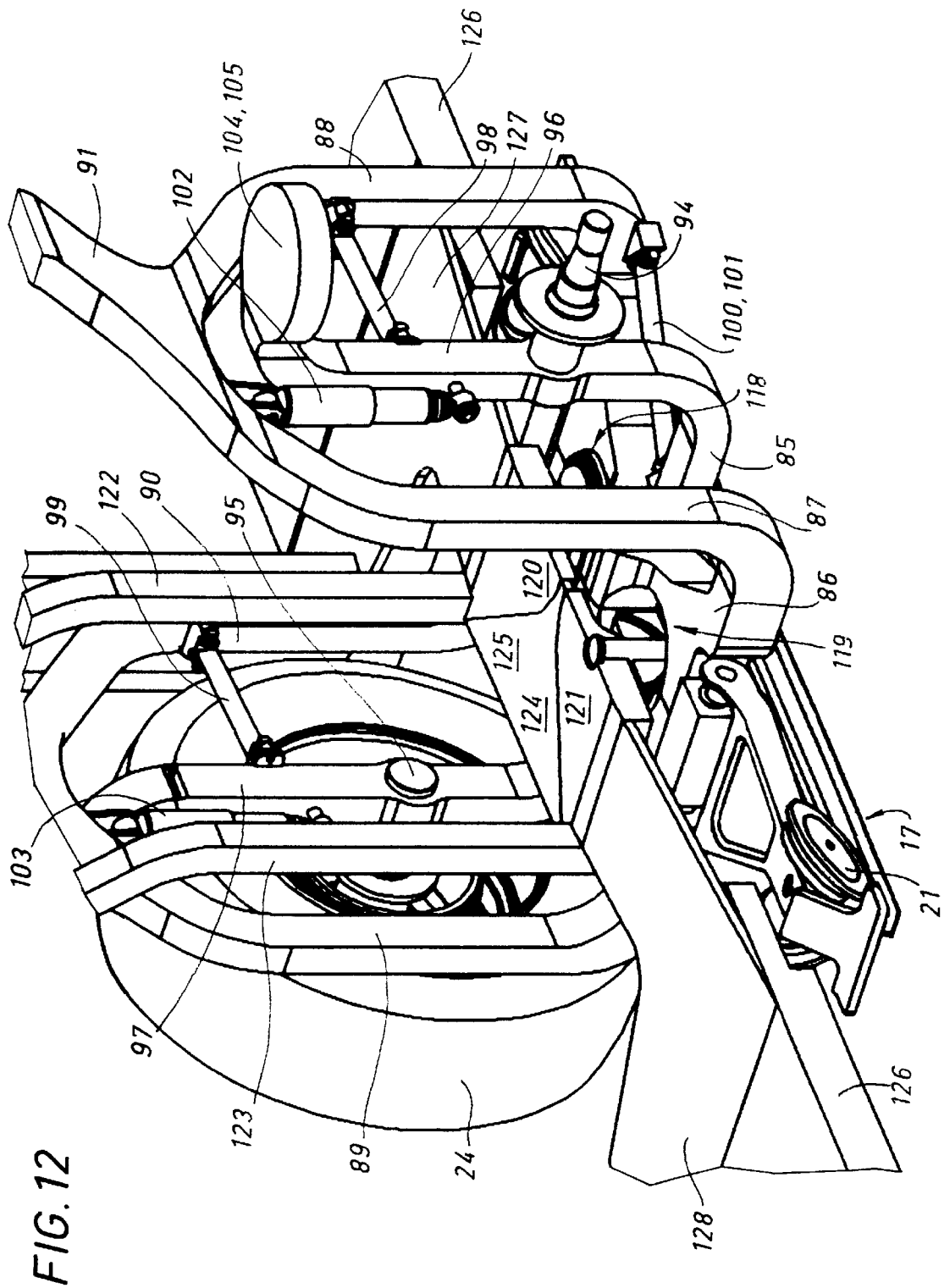
FIG. 12 is a detailed perspective view showing more detail of the space between branches and the lower median portion of the intermediate module.

The connection between the extremity of rear vehicle 9 with the corresponding upper pivoting articulation is accomplished through the specific connection 68, one example of which is shown in detail in FIG. 8.

The purpose of connection 68 is to support the weight of the rear car 9 and to absorb the relative longitudinal, lateral, and mixed displacements caused by rolling and pitching between the end of car 9 and intermediate module 10 at their upper portions.

This connection 68 is a rectilinear element 73 acting as a steering mechanism to accommodate various flexing and twisting deformations; it is attached in such a way that it can be longitudinally displaced. The rectilinear element consists of a packet of sheets of metal 74 cut into plates and immobilized at each end, forming the equivalent of a plate spring capable of twisting.

As FIG. 8 shows, the front extremity of rectilinear element 73 is attached to a support 75 affixed to the body 27 of the pivot articulation associated with rear car 9. Its rear extremity is integral with a casing 76 which is longitudinally displaced with rectilinear element 73 and guided between two vertical upright structures 77, 78. Casing 76 is open along one portion of the length of its two sides near pivot articulation 27 so the plates can bend on either side of a median position when the frame pitches in relation to intermediate module 10, as shown by the dashed line in FIG. 8.

Casing 76 has curved front and back support surfaces 79 and 80.

In this variation, the weight of rear car 9 at the level of intermediate module 10 is supported by this specific connection 68.

At the front a support runner 81 rests on curvilinear upwardly sloped ramp 79 near pivot articulation 27, and at the rear, a triangular friction strip 82 with a rounded end 83 also rests on the sub-surface of the rear downwardly sloped curvilinear ramp 80 which is part of or integral with casing 76.

The front and rear ramps 79 and 80 have a curved profile centered on the lower axle which balances lateral movement of the lower connection. This axle imposes the curvilinear outline of the ramp shapes on the pitching motions.

When rolling motions occur, rectilinear element 73, immobilized at a given point in relation to the vertical support-guides 77, 78, twists to one side or the other (position shown by dashed lines).

During pitching motions, this element slides, but must also follow an inward curve imposed by the lower position of the connection and the pivoting nature of the movements.

The rolling and pitching motions are absorbed when the plates rub together.

According to a supplementary embodiment of the invention shown in FIGS. 9 through 13, the vertical pivot axes of the various articulations and connections are parallel and close together, but distinct from the theoretical ideal pivot axis.

The ideal solution is the best compromise possible between simplicity, ease of construction and cost.

According to this variation, the body of intermediate module 10 is formed around a tubular median transverse frame 84 supported by an axle 85 and defining the profile of the right section of said intermediate module to delineate the interior passageway through the module.

This median transverse frame 84 has a housing on the lower portion along the base 86 which is narrower than the full section of the module, which portion extends upward on either side into two branches 87, 88; 89, 90 defining an open space between them.

The branches rejoin each other at the median portion and consolidate with an intermediate element 91, 92 extending upward with a generally curved upper portion. The area where intermediate elements 91, 92 are located is a wider, transitional zone between the lower portion and the upper, curved portion 93.

The open space between the branches is used to attach axle 85, located on a plane corresponding to the median transverse plane of intermediate module 10, which is also that defined by arc 93 on the upper portion of the transverse frame.

Axle 85 is generally U-shaped, supporting intermediate module 10, with its central portion passing beneath the lower structure of the frame and effectively forming a tunnel in this area. On each of its upper portions, this axle has a wheel pivot 94, 95.

Each upper axle portion extends vertically into a terminal element 96, 97 connecting it to the dual-branch front structure of the median transverse frame 84, perhaps by a transverse rod 98, 99 completed by an oblique lower rod 100, 101. A vertical shock absorber 102, 103 is attached between the branches near the frame and the axle.

The terminal element of each branch of axle 85 terminates in a horizontal transverse plate 104, 105 serving as a support surface for a pneumatic connector 106, 107 connected at its other end to arc 93 of the median transverse frame 84.

According to this variation, the upper articulated connectors on the vehicles are merely connections which are not vertically constrained.

More specifically, front car 8 is connected by a pair of oblique rods 108, 109 of constant length, articulated at a distance from each other to the upper structure of said front car 8 and rejoining each other at a common front articulation point 110 supported by joining plate 111 which is diamond-shaped and integral at the median position with the upper surface of the upper extremity of frame 84.

Connection to the rear car 9 is accomplished using two telescopic shock absorbers 112, 113 obliquely attached between two articulation points 114, 115 separated from each other on the upper structure of rear car 9 and rejoining each other at a common upper rear articulation, or two rear upper articulations 116, 117 which are very close to the other extremity of diamond-shaped joint plate 111.

In the chassis of the intermediate module, within the vertical extension of the rear upper common articulation and the median point of the two rear upper articulations 116, 177, there are a front lower ball joint 118 and a rear lower ball joint 119 which form the vertical and pendular pivot articulation between chassis 14 of the intermediate module and a movable element 120, 121 integral with the frame on the extremity of the front car and the rear car, respectively.

The rear lower ball joint 119 forms a pivoting connection with the rear car and absorbs pitching and rolling motions, as well as assuming the weight of rear car 9.

At the front on the chassis of the intermediate module and within the vertical extension of the common front upper articulation point 110, there is a front ball joint 118 forming the articulated pivot connection with the front car and assuming the weight of front car 8.

Front and rear ball joints 118 and 119 are close together. They are separated only by the axle passing through. The vertical pivot axes are also close to the common median vertical pivot axis of the intermediate module referenced as A–A' on the general schema.

It should be noted that front lower ball joint 118 functions purely to pivot around a vertical pivot axis. The selection of a ball joint for this purpose is governed solely by technological considerations. The pendular effect of the front ball joint is neutralized by upper oblique rods 108 and 109, thereby eliminating any intervening motion.

The upper mechanical grip of each ball joint is shaped like the tip of a shaft, each of which is integral with both the upper ball joint body and also with a pivoting horizontal plate 120, 121, respectively integral with pre-frame 122, 123 of the front and rear car surfaces 8 and 9, articulated at their upper portions to the oblique rods of the upper connection.

Corresponding pivoting plates 120, 121 are shaped so that a generally triangular empty space 124 is formed between them on either side, occupied by a fan-shaped stopping structure 125 which permits them to pivot within the horizontal plane they define.

This unit is covered with a protective plate (not shown).

It is connected on either side with the lower floor 126 of the adjacent vehicles by an inclined ramp 127, 128.

As FIG. 13 shows, although not restricted to such a use, this version is particularly useful with motorized front or rear cabins 6 or 7 articulated in the same way to the adjacent car using an intermediate axle-supported module 10 and the corresponding articulations described above.

This embodiment has a highly symmetrical design and thus permits standard manufacturing methods and vehicle connections to be used.

We claim:

1. A composite articulated connection between first and second successive cars of a self-guiding transportation vehicle, said composite articulated connection comprising:

a rear extremity of the first successive car (8) being supported by and interconnected with a front extremity of an intermediate module (10) by at least one front articulated connection (LAV) transmitting rolling and pitching motion between the first successive car (8) and the intermediate module (10);

a front extremity of the successive second car (9) being supported by and interconnected with a rear extremity of the intermediate module (10) by a rear complex articulated connection;

the intermediate module (10) having an axle supporting at least one pair of rotatable wheels; and the intermediate module (10) further having a ground structure engagement guidance system, separate from the wheels, for engaging with a ground structure and guiding the intermediate module (10) during use, and the intermediate module (10) defining a vertical axle axis (A–A', 28) extending through a center of the axle supporting the at least one pair of rotatable wheels and being perpendicular thereto;

the at least one front articulated connection (LAV) pivoting about a first vertical axis (C–C') extending vertically thorough the intermediate module (10) and being parallel to the vertical axle axis (A, A', 28); and the rear complex articulated connection (LAR) comprising a first upper rear clearance stabilizing articulated connection (LASD) and a second lower rear articulated connection (CIAD), both the upper and lower rear articulated connections pivoting about at least one second vertical axis (B–B') extending vertically thorough the intermediate module (10) and parallel to the vertical axle axis (A, A', 28), and the rear complex articulated connection (LAR) absorbing, during use, both rolling and pitching movement between the intermediate module (10) and at least the second successive car (9).

2. The composite articulated connection according to claim 1, wherein the first axis (B–B') and second axis (C–C') are coincident with one another and with the vertical axle axis (A–A', 28), the at least one front articulated connection (LAV) is an upper articulated connection (26) pivoting about the vertical axle axis (28) and further includes a lower articulated connection pivoting about the vertical axle axis (28), and the upper rear articulated connection (27) pivots about the vertical axle axis (28) and the lower rear articulated connection pivots about two mutually perpendicular axes (61, 64).

3. The composite articulated connection according to claim 2, wherein the lower rear articulated connection comprises a universal joint located between two movable end frames (56, 57) provided adjacent to a front extremity of the second successive car (9), and the universal joint has both a transverse pivot axis (61) and a longitudinal median pivot axis (64).

4. The composite articulated connection according to claim 3, wherein the front lower articulated connection is a sprocket articulation (29).

5. The composite articulated connection according to claim 4, wherein the lower sprocket articulation (29) is formed by a plurality of vertical rollers (51, 52) disposed in two groups supported by a plurality of vertical axes integral with a chassis of the intermediate module (10), and said plurality of vertical rollers are displaced along two opposing paths (47, 48) which form an arc.

6. The composite articulated connection according to claim 2, wherein the rear lower articulated connection is a sprocket articulation.

7. The composite articulated connection according to claim 6, wherein the lower sprocket articulation (29) is formed by a plurality of vertical rollers (51, 52) supported by a plurality of vertical axes integral with a chassis of the intermediate module (10), and said plurality of vertical rollers (51, 52) are displaced along two opposing paths (47, 48) which form an arc.

8. The composite articulated connection according to claim 2, wherein the upper clearance stabilizing articulated connection (LASD) between two movable end frames (56, 57) adjacent to the second successive car (9) is a connection which comprise at least one shock absorber (58, 59) which interconnects the intermediate module (10) with the first successive car (8).

9. The composite articulated connection according to claim 2, wherein upper pivots of the front articulated connection and the rear articulated connections are superimposed over one another and have a common pivot axis (28) which is coincident with the vertical axle axis (A–A', 28).

10. The composite articulated connection according to claim 1, wherein the first axis (B–B') and the second axis (C–C') are coincident with one another and with the vertical axle axis (A–A', 28), the front articulated connection (LAV) consists of an upper articulated connection (26) which pivots about the vertical axle axis (28) and a lower quasi-pivoted articulated connection which pivots about the vertical axle axis (28), and the rear articulated connection (LAR) consists of an upper articulated connection (27) which pivots about the vertical axle axis (28) and the upper clearance stabilizing articulated connection (68) and the lower articulated connection pivoting about two mutually perpendicular axes (61, 64).

11. The composite articulated connection according to claim 10, wherein the lower articulated connection pivoting about two mutually perpendicular axes (61, 64) is formed by two oblique rods with ball joint connections (69, 70) which are attached, in a symmetrical relationship to a median longitudinal vertical plane of the intermediate module (10), to a chassis (14) of the intermediate module (10) and to a lower portion of an end frame (67) of the first successive car (8).

12. The composite articulated connection according to claim 10, wherein the lower articulated connection pivoting about two mutually perpendicular axes (61, 64) is formed by two oblique rods (71, 72) with ball joint connections which are attached, in a symmetrical relationship to a median longitudinal vertical plane of the intermediate module (10), to a chassis (14) of the intermediate module (10) and to a lower portion of an end frame (56) of the second successive car (9).

13. The composite articulated connection according to claim 10, wherein the front lower articulated connection is formed from two lower articulated oblique rods (71, 72) which are quasi-pivoting rods.

14. The composite articulated connection according to claim 10, wherein the upper clearance stabilizing connection (68) is a rectilinear connection capable of both a flexing and a twisting motion.

15. The composite articulated connection according to claims 10, wherein the upper clearance stabilizing connection (68) supports a weight of the first successive car (8) and the second successive car (9) and comprises of a rectilinear directional element (73) formed of a plurality of metal plates (74) which are interconnected at each end and attached by only one end to a casing (76) which has lateral surfaces, and the upper clearance stabilizing connection has stabilizers and is longitudinally guided.

16. The composite articulated connection according to claim 15, wherein a front extremity of the rectilinear directional element (73) is attached to a support (75) which is affixed to the upper articulation (27) of an upper pivot block (25) associated with the second successive car (9), and a rear extremity is integral with the casing (76) which is longitudinally displaceable with the rectilinear directional element (73) and which is guided between two vertical supports (77, 78), and one portion of longitudinal sides of a body of the casing (76), near the upper articulation (27), is open so that lateral and vertical motion forces can bend the plurality of metal plates (74).

17. The composite articulated connection according to claim 16, wherein a front and a rear of the casing (76) comprise curved support ramps, which slope upward and downward (79, 80), respectively, and a support runner (81) contacts the upwardly sloped curved ramp (79) adjacent the upper articulated connection (27) and behind a triangular friction strip (82) with a rounded end (83) contacting a subsurface of the rear, the downwardly sloped curved ramp (80) is integral with the casing (76), and said front and rear ramps are curved and centered on a lower balance axle when a lower pivot center is subjected to the vertical and lateral movements.

18. The composite articulated connection according to claim 1, wherein the front articulated connection (LAV) comprises an upper articulated connection which comprises two oblique rods (108, 109) of constant length which are articulated at extremities thereof and separated from each other on an upper portion of an end frame of the first successive car (8), when at a common articulation point (110) pivoting about the first vertical axis on a plate joint (111) integral with an upper surface of a median frame (84) of a frame work of the intermediate module (10), and when on a lower pivot articulation on the first vertical axis, and the second articulated connection (LAR) with the second successive car (9) is formed of an upper articulated connection comprising two oblique, telescoping shock absorbers (112, 113) which are expandably mounted with ball joint connectors, at respective extremities thereof, to an upper portion of an end frame of the second successive car (9) and on the plate joint (111) at said at least one second vertical axis which includes two proximal articulation points, and then at a lower pivoting and balancing articulation of the at least one second vertical axis.

19. The composite articulated connection according to claim 18, wherein the first and second vertical axes are located proximate to one another and to the vertical axle axis (A–A') which extends perpendicular to the drive axle of the intermediate module (10).

20. The composite articulated connection according to claim 18, wherein the pivoted articulation of the front lower articulated connection (LAV) is a first lower ball joint (118), and the pivoted and balance articulation of the rear lower articulated connection (LAR) is a second lower ball joint (119), and each of the first and second lower ball joints assist with vertical and perpendicular articulation between a chassis (14) of the intermediate module (10) and a movable piece (120, 121) which is integral with an end frame of the first successive car (8) and an end frame of the second successive car (9), respectively.

21. The composite articulated connection according to claim 18, wherein the pivoted articulation of the front lower articulated connection (LAV) comprises two oblique rods and the pivoted and balance articulation of the rear lower articulated connection (LAR) is a lower ball joint (119), and the two oblique rods and the lower ball joint (119) assist with vertical and perpendicular articulation between a chassis (14) of the intermediate module (10) and a movable piece (120, 121) which is integral with an end frame of the first successive car (8) and an end frame of the second successive car (9), respectively.

* * * * *